July 23, 1957     H. J. HORN     2,800,368

SPRING CLIP FOR VEHICLE WHEEL

Filed July 16, 1953

INVENTOR.
HARRY J. HORN
BY
Barnes, Kisselle, Laughlin & Raisch
ATTORNEYS

United States Patent Office 2,800,368
Patented July 23, 1957

2,800,368

SPRING CLIP FOR VEHICLE WHEEL

Harry J. Horn, Lansing, Mich., assignor to Motor Wheel Corporation, Lansing, Mich., a corporation of Michigan Application July 16, 1953, Serial No. 368,359

5 Claims. (Cl. 301—108)

This invention relates to a clip structure for mounting a cover plate or hub cap to a wheel assembly and also pertains to the structure of the wheel to accommodate the clip.

The present day practice in wheel trim for vehicles is to use either a large cover or a smaller hub cap. The smaller hub caps are usually held on the wheel by resilient clip members appropriately spaced whereas such clips are not usually employed to hold the larger covers.

There are several reasons why permanent attachment of these clips by riveting or otherwise is objectionable. For example, if large covers are mounted on the wheels, clips are not in use and this represents an added expense. Also, if permanent clips are not attached originally, contemplating use of large covers, then a subsequent desire to change to small hub caps become impractical if not impossible Resort has therefore been had to detachable clips. In this regard it has been the practice to provide a wheel structure with slots wherein a clip could be attached and detached by a vehicle owner, as desired. However, many of the clips in use are insertable only from the inside of the wheel thus necessitating removal thereof. Furthermore, provision of holes in certain areas of the wheel structure has resulted in weakening thereof. Formerly, the clips were located in the bolting flange where the weakening effect of the holes has no effect on the strength of the wheel. However, such location was found impractical when larger hub caps came into use because the length of the clip needed made it too flexible to effectively retain the cap on the wheel.

With the above in mind, it is a primary object of this invention to provide a spring clip for retaining a hub cap which can be inserted and removed from the front side of a wheel.

It is another object of this invention to provide a clip of the nature described which can be demountably attached to the bolting-on flange of a wheel body and still remain effective in retaining a hub cap on the wheel.

It is a further object of this invention to provide a clip of the nature described which can be attached to, or removed from, the wheel as many times as desired without affecting the resilience or hub cap retaining ability of the clip.

It is another object of this invention to provide a wheel structure which may be adapted for receiving a hub cap retaining clip without any weakening thereof.

It is still another object of this invention to simplify the attaching and replacing of such a clip to a vehicle wheel.

These and other objects will become apparent upon reference to the following description and the accompanying drawings, in which.

Figure 1:
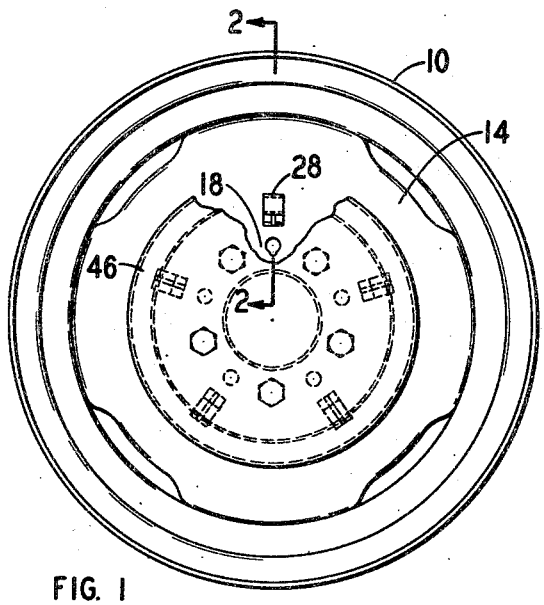
Fig. 1 is an elevation of a wheel having the clip installed and fitted with a hub cap.
Figure 2:
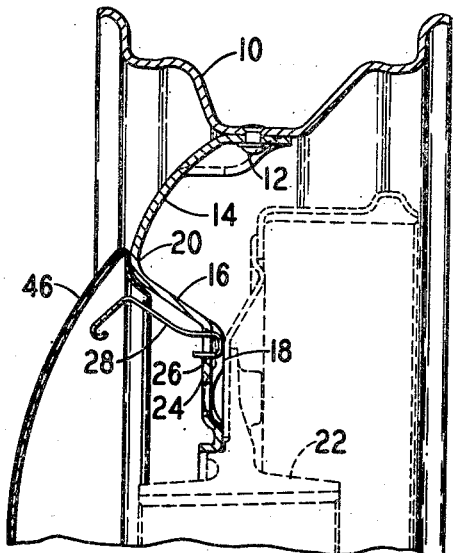
Fig. 2 is a section taken on line 2—2 of Fig. 1 showing the application of the clip to the body of the wheel.
Figures 3, 4, 5:
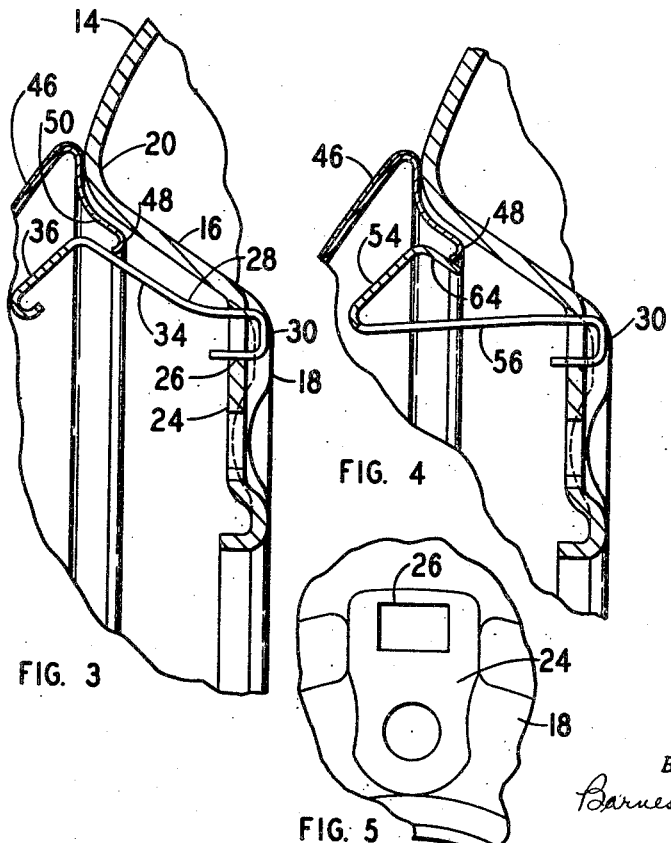
Fig. 3 is an enlarged view of a portion of Fig. 2.
Fig. 4 is a view similar to Fig. 3 but shows a modified form of the clip.
Fig. 5 is a partial plan view of the wheel body of Fig. 1 and shows the configuration of the opening for reception of the clip.

Referring in particular to the drawing, Figs. 1–3 show a wheel having a drop center rim 10 attached to the wheel body by rivets 12. The wheel body comprises an outer annular dished portion 14, an intermediate annular flange 16 and a radially disposed bolting-on flange 18. The outer and intermediate portions meet in a rounded nose portion 20 the particular function of which will be explained later. The bolting-on flange is provided with a central opening for the reception of a hub 22 shown in dotted lines.

Figure 6:
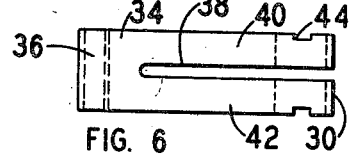
Fig. 6 is a plan view of the clip utilized in Figs. 1–3.
Figure 7:
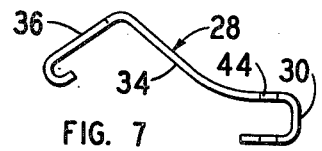
Fig. 7 is an elevation of the clip of Fig. 6.

The bolting-on flange 18 is provided at circumferentially spaced intervals with flattened areas 24, best seen in Fig. 3. Each of these areas is provided with slots or openings 26 of a generally rectangular shape as seen in Fig. 5. Each of these openings is adapted to receive a portion of a spring clip 28, the details of which are seen in Figs. 6 and 7 and will be subsequently described. It will be understood that the bolting-on flange 18 may be provided with as many flat areas as desired, depending on the number of clips to be used, five being shown in Fig. 1.

Referring now to Figs. 6 and 7, a detailed description of the clip 28 will be given. The clip is a resilient spring member, being preferably constructed of a tempered piece of strip spring steel. The rear end of the clip is a U-shaped or looped portion 30, this being the part adapted for insertion in slot 26. The upper leg of the U, as seen in Fig. 7, extends into an elongated and arcuate intermediate or central portion 34 which terminates in a flat front end portion 36, the latter being angularly inclined relative to central portion 34. The clip is bifurcated in that it has an open slit or slot 38 longitudinally and medially disposed therein an dextending throughout substantially the entire length of central portion 34 and the U-shaped end portion 30. This slit divides the central and U-shaped portions into a pair of legs which are designated 40 and 42 in the drawings.

The end 30 is also provided with four notches, as 44, each leg 40 and 42 having two such notches. As shown in Fig. 7, the notches in opposed relation in the U-shaped end 30 are in alignment.

In use, the clip 28 is mounted on the wheel body from the front thereof by compressing or squeezing the legs 40 and 42 together by hand or by a tool, such as a pair of pliers, whereupon the U-shaped end 30 may be inserted into the openings 26 and positioned such that the notches 44 are in registry with the side edges of the opening 26. The legs 40 and 42 are then permitted to spring back into their normal positions and as such, bear against the side edges of opening 26. The upper and lower legs of the U-shaped end 30 likewise bear against the upper and lower edges respectively, of opening 26. Thus the clip is firmly seated in the wheel body. It will be understood that the notches 44 are slightly larger in width than the thickness of the wheel body and furthermore, to properly hold the clip in a tensioned condition, the length of opening 26 in a direction circumferentially of the wheel, may be slightly less than the distance from the bottom of one notch 44 in leg 40 to the bottom of the corresponding notch 44 in the other leg 42.

Referring now to Fig. 3, the clip 28 is shown installed on the wheel body. When the hub cap 46 is positioned on the front of the wheel body, as shown, the peripheral bead 48 of cap 46 presses radially inwardly against the outer end of portions 34 of the clips. This causes a radial compression of the upper and lower legs of the U-shaped end 30 in opening 26. The clip reacts against the bead 48 urging the arcuate rim 50 in an axial direction to nest into engagement with nose 20 of the wheel body.

It will be readily apparent therefore that the hub cap 46 is securely retained in position and cannot be easily loosened or accidentally removed. It should also be noted that no force tends to bend or compress the clip sideways since all of the forces acting on the clip are in a radial direction and thus the clip will stay securely in position.

In this latter regard an important advantage of this invention should be recognized. Generally the forces acting on the clip are two and each acts in a different plane and in a different manner on the clip. One force is the radial thrust exerted against central portion 34 by the hub cap and the other is the compression existing between legs 40 and 42 when the clip is seated in opening 26. The latter force acts in the plane of the clip and in a direction substantially perpendicular to the above mentioned radial force. Thus the stresses resulting from these forces are substantially independent of each other so that the number of times the clip is inserted in or removed from opening 26 will not affect the ability of the clip to exert its maximum resilience or retaining action on the hub cap.

Figure 8:
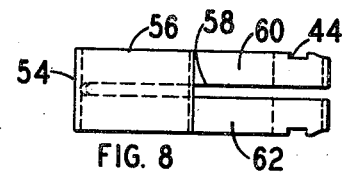
Fig. 8 is a plan view of the clip utilized in Fig. 4.
Figure 9:
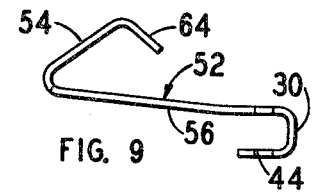
Fig. 9 is an elevation of the clip of Fig. 8.

Figs. 4, 8 and 9 show a modification of the invention wherein a reverse type of clip 52 is employed. The clip 52 is generally similar to clip 28. However, the front portion 54 is return bent and the intermediate portion 56 is a substantially straight member. A slot 58 divides portion 56 into leg members 60 and 62 as in clip 28. Slot 58 is longer than slot 38 of the clip shown in Fig. 6. Also the bight portion of the U-shaped end 30 is slightly tapered to facilitate assembly of the clip with the wheel.

In position, the hub cap 46 applies a force through bead 48 to the extended lip 64 on the clip and the reaction at the U-shaped end 30 is similar to that discussed in relation to clip 28.

It will be clear that the clip and wheel construction provide a simple and economical manner of holding a hub cap on a wheel. The construction leaves it up to the discretion of the user to employ a hub cap or a larger wheel cover and conversion from one to the other is a simple operation. The configuration and construction of the clip itself is simple and yet is highly durable and effective for the purpose intended.

I claim:

1. The combination comprising a vehicle wheel having a body provided with a plurality of generally flat, radially extending areas spaced circumferentially around the wheel body, a hub cap, a rectangular opening in each of said flat areas, and means for removably mounting said hub cap on the body portion of the wheel comprising a spring clip engaged in each of said openings and extending generally axially outwardly from the outer face of the wheel into retaining engagement with the hub cap, each said clip comprising a flat spring strip having a U-shaped portion adapted to extend through its respective opening, said U-shaped portion being positioned such that one leg of the U is spaced radially from the other leg of the U, each said leg being bifurcated in a direction axially of the cover to provide a pair of spaced apart, axially extending leg members, each pair of leg members being in radially spaced superimposed relationship with the other pair of leg members, each leg member having a notch therein along the outer edge of said member, said notch in one leg member being radially aligned with the notch in the leg member with which it is in superimposed relationship, said notches engaging the radial side edges of said opening, said notches having an axial extent corresponding generally to the thickness of the wheel body at said radial side edges of said openings and providing abutments on opposite faces of the wheel body adjacent said radial side edges of said openings, said abutments engaging the opposite faces of said wheel body to prevent axial movement of said spring clips on the wheel body, each said clip including an intermediate portion extending outwardly from one of said legs of said U-shaped portion, said bifurcation of said one leg extending into and substantially throughout the extent of said intermediate portion to form spaced arms, said leg members and said arms of said intermediate portion being yieldably movable circumferentially of the wheel toward each other to permit insertion of the clip into said opening from the outer face, and an end portion angularly inclined to said intermediate portion, said cover engaging said end portion of said clip when mounted on said wheel body.

2. The combination set forth in claim 1 wherein said wheel body includes an annular bolting-on flange, an intermediate annular flange extending axially outwardly from said bolting-on flange and an annular dished portion extending radially outwardly and axially inwardly from said intermediate annular flange, said annular flange and annular dished portion forming an annular nose portion spaced radially and axially from said bolting-on flange, said rectangular openings being positioned in said bolting-on flange, said hub cap being adapted to engage said nose and being forced against said nose by the engagement with said clip.

3. The combination set forth in claim 1 wherein said end portion of each said clip is inclined radially and axially inwardly of the wheel body, the circumferential edge of said hub cap engaging said end portion of each said clip and tending to flex said end portion radially inwardly.

4. The combination set forth in claim 1 wherein the end portion of each said clip is inclined radially inwardly and axially outwardly of the wheel body, the circumferential edge of said hub cap engaging said clip and tending to flex said clip inwardly.

5. The combination set forth in claim 1 wherein said intermediate portion extends outwardly from the radially outermost leg of said U-shaped portion.

References Cited in the file of this patent

UNITED STATES PATENTS

| | | |
|---|---|---|
| 2,096,319 | Churchill | Oct. 19, 1937 |
| 2,148,091 | Van Uum | Feb. 21, 1939 |
| 2,217,116 | Hunt et al. | Oct. 8, 1940 |
| 2,450,306 | Sickles | Sept. 28, 1948 |
| 2,470,559 | Horn | May 17, 1949 |
| 2,531,911 | Johnson | Nov. 28, 1950 |